United States Patent Office.

FRANZ SCHOLL, OF HÖCHST-ON-THE-MAIN, GERMANY, ASSIGNOR TO THE FARBWERKE, VORMALS MEISTER, LUCIUS & BRÜNING, OF SAME PLACE.

YELLOW DYE AND PROCESS OF MAKING SAME.

SPECIFICATION forming part of Letters Patent No. 656,857, dated August 28, 1900.

Application filed June 23, 1900. Serial No. 21,299. (Specimens.)

*To all whom it may concern:*

Be it known that I, FRANZ SCHOLL, Ph.D., a citizen of the Empire of Germany, residing at Höchst-on-the-Main, Germany, have invented certain new and useful Improvements in the Manufacture of Substantive Dyestuffs for Cotton Fast to Alkali, Acid, and Light, of which the following is a specification.

I have found that a beautiful yellow dyestuff for cotton may be obtained with good yield by combining diazotized primulin with 1-phenyl-3-methyl-5-pyrazolone. To manufacture this dyestuff, I employ the diazotized sulfonic acid of the primulin base obtained by heating paratoluidin with sulfur on the one hand and 1-phenyl-3-methyl-5-pyrazolone on the other hand.

Example: Seventy-five kilos of primulin sulfonic acid and seven kilos of sodium nitrite are dissolved in one thousand liters of water. This solution is run while stirring into thirty-six kilos of hydrochloric acid (thirty-per-cent. strength) and about one hundred liters of water. After a few hours the diazo compound thus obtained is run into a solution of eighteen kilos of 1-phenyl-3-methyl-5-pyrazolone and twenty kilos of sodium carbonate in about two hundred liters of water. The combination is soon completed. The dyestuff is salted out. The dyestuff thus obtained by combining one molecular proportion of diazotized primulin with one molecular proportion of 1-phenyl-3-methyl-5-pyrazolone is a yellow-brown powder easily soluble in hot water, soluble with difficulty in cold water with a light-yellow color, darkening on addition of caustic alkali, fairly soluble in alcohol, and insoluble in ether, petroleum, and benzene. It separates from its aqueous solution in the form of a gelatinous mass upon the addition of mineral acids, is soluble in concentrated sulfuric acid with a yellow color, and dyes unmordanted cotton in a neutral and alkaline bath pure yellow.

Having thus described my invention, I claim—

1. As a new product, the new yellow dyestuff obtained by combining one molecular proportion of diazotized primulin with one molecular proportion of 1-phenyl-3-methyl-5-pyrazolone, being a yellow-brown powder, easily soluble in hot water, soluble with difficulty in cold water with a light-yellow color, fairly soluble in alcohol, insoluble in ether, petroleum and benzene, on the addition of mineral acids separating from its aqueous solution in the form of a gelatinous mass, soluble in concentrated sulfuric acid with a yellow color, and dyeing unmordanted cotton in a neutral and alkaline bath pure yellow, substantially as set forth.

2. The herein-described process of manufacturing an azo dyestuff directly dyeing cotton yellow, which consists in allowing diazotized primulin sulfonic acid to act upon 1-phenyl-3-methyl-5-pyrazolone, substantially as set forth.

In testimony that I claim the foregoing as my invention I have signed my name in presence of two subscribing witnesses.

FRANZ SCHOLL.

Witnesses:
 HEINRICH HAHN,
 ALFRED BRISBOIS.